US005577206A

United States Patent [19]
Friedrich et al.

[11] Patent Number: 5,577,206
[45] Date of Patent: Nov. 19, 1996

[54] SYSTEM FOR PHYSICAL LAYER CONTROLLERS FOR PERFORMING AUTOMATIC HARDWARE BASED SCRUBBING OF INPUT AND OUTPUT DIRTY FLAGS FOR UPDATING SYSTEM CONFIGURATION CHANGES

[75] Inventors: Walter R. Friedrich, Pleasanton, Calif.; James R. Hamstra, Shorewood; James F. Torgerson, Andover, both of Minn.

[73] Assignee: National Semiconductor Corporation, Santa Clara, Calif.

[21] Appl. No.: 28,342

[22] Filed: Mar. 9, 1993

[51] Int. Cl.⁶ .................................................... G06F 13/00
[52] U.S. Cl. .................... 395/200.02; 395/839; 364/229; 364/229.3; 364/229.4; 364/242.94
[58] Field of Search .................. 370/29–89; 340/825.05; 395/200

[56] References Cited

U.S. PATENT DOCUMENTS

| | | | |
|---|---|---|---|
| 4,652,874 | 3/1987 | Loyer | 340/825.05 |
| 4,745,598 | 5/1988 | Ulug | 370/89 |
| 4,962,497 | 10/1990 | Ferenc et al. | 370/60.1 |
| 5,084,870 | 1/1992 | Hutchison et al. | 370/94.1 |
| 5,093,827 | 3/1992 | Franklin et al. | 370/60.1 |
| 5,182,747 | 1/1993 | Frenzel, III et al. | 370/85.5 |
| 5,305,306 | 4/1994 | Spinney et al. | 370/29 |
| 5,355,124 | 10/1994 | Kochem et al. | 340/825.05 |

OTHER PUBLICATIONS

Sankar et al. "An Automatic Failure . . . (FDDI)" Jun. 1992, pp. 186–190.
Hanstra FDDI Design Tradeoffs 1988 pp. 297–300.

Primary Examiner—Thomas C. Lee
Assistant Examiner—Marc K. Weinstein
Attorney, Agent, or Firm—Hickman Beyer & Weaver

[57] ABSTRACT

A physical layer controller for use in a data transmission network is disclosed which includes an automatic scrubbing arrangement that is activated upon the occurrence of a physical layer controller reconfiguration. The transmitter output port as well as each channel output of the physical layer controller has an output dirty flag associated therewith. Similarly, the input port as well as each channel input has an associated input dirty flag. A scrubbing arrangement automatically scrubs certain outputs after a configuration change. More specifically, in the absence of a blocking condition after a configuration change, the scrubbing arrangement will automatically scrub each output which has a new source and one of: 1) its associated output dirty flag is set to a first level; and 2) it is connected to an new source which has its associated input dirty flag set to a first level. In a method aspect, output dirty flags are set for each output that has the potential to transmits a data frame. Outputs which have data frame detection available are considered to have the potential to transmit a data frame only when they sense a frame start. Outputs that do not have data frame detection available, are considered to have the potential of having transmitted a data frame anytime they are enabled and coupled to a valid input. The input dirty flags are set for each input that is connected to an output for which the output dirty flag is set.

38 Claims, 6 Drawing Sheets

SYSTEM FOR PHYSICAL LAYER CONTROLLERS FOR PERFORMING AUTOMATIC HARDWARE BASED SCRUBBING OF INPUT AND OUTPUT DIRTY FLAGS FOR UPDATING SYSTEM CONFIGURATION CHANGES

BACKGROUND OF THE INVENTION

1. Field of the Invention

The present invention relates generally a hardware based scrubbing implementation for use in physical layer controllers used in data transmission networks.

2. Discussion of the Prior Art

One type of high speed data transmission network is defined by the Fiber Distributed Data Interface (FDDI) protocol. The FDDI protocol is an American National Standards Institute (ANSI) data transmission standard which applies to a 100 Mbit/second token ring network that utilizes an optical fiber transmission medium. The FDDI protocol is intended as a high performance interconnection between a number of computers as well as between the computers and their associated mass storage subsystem(s) and other peripheral equipment. Information is transmitted on an FDDI ring in frames that consist of 5-bit characters or "symbols", each symbol representing 4 data bits. Tokens are used to signify the right to transmit data between stations. The FDDI Station Management (SMT) standard provides the necessary control of an FDDI station (node) so that the node may work cooperatively as a part of an FDDI network.

To effectively implement the functions required, SMT is divided into three entities, namely the Connection Management entity (CMT), the Ring Management entity (RMT) and the Frame Based Services. The Connection Management (CMT) is the management entity in the Station Management that is responsible for the node's port(s), as well as the connection to the ports of neighboring nodes.

The Connection Management is further divided into three sub-entities. They include, the Physical Connection Management (PCM), Configuration Management (CFM) and Entity Coordination Management (ECM). The CFM is responsible for defining the interconnections of the ports and MAC(s) within a node. Thus the CFM controls the routing of data within the node. In hardware implementations, the routing through each resource is controlled by programming a configuration switch. A general description of the Station Management standard, as well as each of its subparts, including the Connection Management (CMT), the Configuration Management (CFM) and the Physical Connection Management (PCM) is described in detail in the draft ANSI FDDI Station Management Standard, dated Jun. 25, 1992, which is incorporated herein by reference.

The members of an FDDI network generally fall into the classifications of single attachment nodes and dual attachment nodes. Dual attachment nodes have two ports to accommodate the dual trunk tings of the FDDI network. Single attachment stations have a single port and therefore cannot directly attach to the dual trunk tings. Rather, the single attach stations typically are coupled to the trunk rings through a concentrator that forms the root of a tree. The concentrator may be single attachment or a dual attachment type. Thus, a typical FDDI network may consist of a plurality of dual attachment nodes arranged in a trunk ting. The dual attachment nodes may include both dual attachment stations and dual attachment concentrators. Each dual attachment concentrators forms the root of a concentrator tree. The concentrator tree may include various concentrators that form the root of tree branches and stations. As used hereafter, the terms "node" and "station" are intended to be generic and apply to both formal FDDI stations and FDDI concentrators.

Each dual attachment node contains two Ports designated as A and B. Port A is intended to be connected to the primary ring on the incoming fiber and the secondary ring on the outgoing fiber. Similarly, Port B is intended to be connected to the incoming fiber of the secondary ring and the outgoing fiber of the primary ting. Therefore a properly formed trunk ring is composed of a set of stations with the Port A of one station being connected to the port B of the neighboring station.

Concentrator nodes contain one or more Ports of type M to provide connections within a concentrator tree. A single attachment node (whether it be a station or concentrator) has an S type Port which is intended to be attached to an M type port within a concentrator tree. Accordingly, a standard FDDI network would typically have as many as four different types of ports. That is, A, B, M, & S type ports. Each of these port types requires a physical layer controller.

The FDDI SMT standard contemplates that there are numerous internal configurations that an FDDI node must be able to support. For example, any given port may be isolated. That is, not connected to any other internal ports or MACs. In this situation data received through an input line $P_{in}$ would be passed directly out of the node through the output line $P_{out}$ of the same port. Alternatively, a port may route received data through only one of a primary internal path, a secondary internal path or a local internal path that are located within the node. In such cases, after passing through the selected internal data transmission path, the data may be outputted from the node through either the same port or a different port, depending upon the circumstances. For example, when a loop test is being conducted, it is common to output the data through the same port that it is received by.

The standard active FDDI configuration for a dual attach station is a thru configuration wherein the network's primary data transmission path enters the A port, passes through the nodes internal primary path and emerges from the B port. At the same time the network's secondary data transmission path enters the B port, passes through the nodes internal secondary path and exits through the A port. The internal paths may require the data to physically pass through any number of (or no) MACs. Alternatively, the port may be connected in a concatenated arrangement wherein after entering through the input line $P_{in}$ of a particular port, the data path passes through both the primary and secondary internal data paths within the node before exiting the output line $P_{out}$ of the same port. In a dual attach station, this arrangement is particularly likely in the event of a failure in the second port or a failure in the connection between the second port and its neighbor. The internal configurations that are permissible in accordance with the FDDI standards are set forth in detail in the above referenced SMT standard.

As is well known to those familiar with FDDI data transmission networks, a station or concentrator (node) that is to form an active part of an FDDI network must be capable of reconfiguring itself in the event of a failure in the network. When such a failure occurs, it is often difficult to determine whether the information currently on the ring is consistent or not as well. Therefore, the FDDI standards call for erasing information that is on the ring when a fault occurs if there is a possibility that the information can be isolated from the media access controller (MAC) that sourced the information. This is referred to as scrubbing.

If scrubbing is controlled through software intervention, then the reconfiguration process is slowed unnecessarily. On the other hand, if all of the outputs are scrubbed, data transmission paths that are not affected by the reconfiguration would be broken unnecessarily for a period of time, thereby reducing the network performance.

SUMMARY OF THE INVENTION

Accordingly, it is an object of the present invention to provide a physical layer controller that is capable of executing hardware based scrubbing in a complete and relatively efficient manner.

To achieve the forgoing and other objects and in accordance with the purpose of the present invention, a physical layer controller having an automatic scrubbing arrangement is disclosed. The physical layer controller is adapted for controlling the physical layer of a node that is capable of insertion into a data transmission network. As such, the physical layer controller includes a receiver having a receiver input and a transmitter having a transmitter output. It also includes a channel having a channel input and a channel output. A plurality of output dirty flags are provided with each output dirty flag being associated with one of the outputs. Similarly, a plurality of input dirty flags are provided with each input dirty flag being associated with one of the inputs. A scrubbing arrangement automatically scrubs certain outputs after a configuration change. More specifically, in the absence of a blocking condition after a configuration change, the scrubbing arrangement will automatically scrub specific outputs or inputs so that each output which has a new source and one of: 1) has its associated output dirty flag set to a first level; or 2) is connected to a new source which has its associated input dirty flag set to a first level, will be scrubbed.

In a preferred embodiment, a plurality of channels are provided with each channel having an associated channel input and channel output. In another preferred embodiment, a scrub timer register is provided that may be selectively read and written into by the user. The scrub timer register is arranged to control the length of time that scrubbing occurs after a configuration change.

In another preferred embodiment, a status register is provided that may be read by the user. The status register includes a plurality of output scrubbing flags with each output scrubbing flag being associated with a particular output and arranged to indicate whether scrubbing is being performed on its associated output.

In another preferred embodiment, at least one scrubbing disable flag that can be set by a user is provided. When the physical layer controller enters a configuration associated with a set scrubbing disable flag, the scrubbing disable flag acts as a blocking condition that disables the automatic scrubbing function.

In still another preferred embodiment that is adapted specifically for use in data transmission networks that operate substantially in accordance with the FDDI protocol, a null configuration register, a join configuration register and a loop configuration register are provided. The null configuration register stores information indicative of the desired configuration of the physical layer controller when a CFM state machine is in a null configuration. Similarly, the join and loop configuration registers store information indicative of the desired configuration when the CFM state machine is in the join and loop configurations respectively. A null scrubbing disable flag, a join scrubbing disable flag and a loop scrubbing disable flag that can be set by the user are each provided as well. Each scrubbing disable flag is associated with a corresponding configuration and when set is arranged to disable the automatic scrubbing function when the physical layer controller enters a configuration associated therewith.

In a method aspect of the invention, the output dirty flag associated with each enabled output that transmits a signal sourced from an input that has the potential to transmit a data frame is set. Either a frame detecting circuit can be used to detect the potential passage of a frame, or it can be assumed that any output that does not have an associated frame detecting circuit has the potential to transmit a data frame when it is connected to a valid input. Further the input dirty flag associated with each input that is connected to an output for which an output dirty flag is set is also set. When a configuration change occurs each output in the updated configuration is scrubbed which has a new source and at least one of: 1) its associated output dirty flag is set; or 2) the input dirty flag of the output's new source is set. After scrubbing the input and output dirty flags associated with the outputs that have been scrubbed are reset in accordance with the characteristics of the updated configuration.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
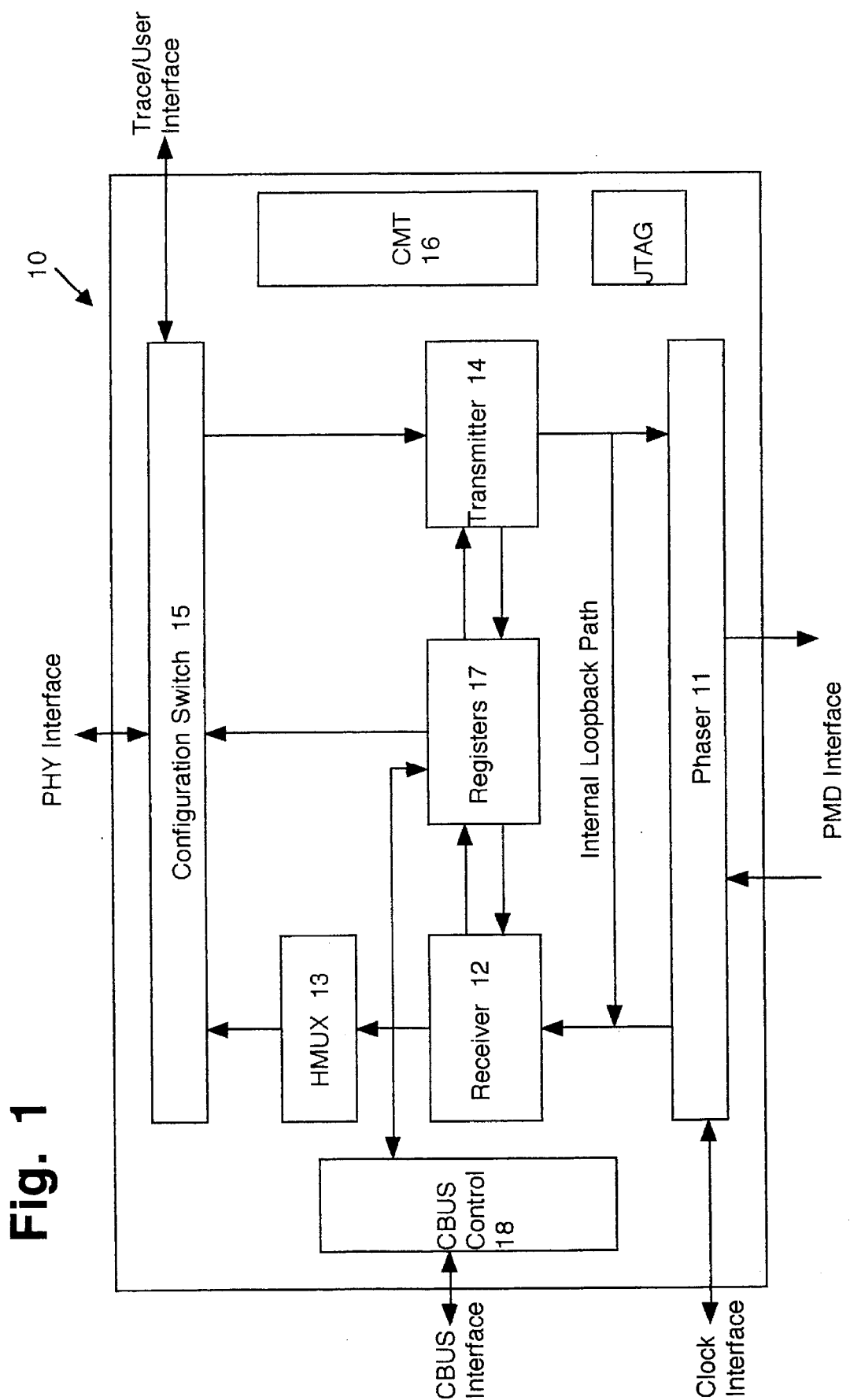
FIG. 1 is a block diagram of a Physical Layer Controller.

FIG. 1 shows a block diagram of a Physical Layer Controller (PLAYER™) 10 which implements the Physical Layer (PHY) functions as defined by the Fiber Distributed Data Interface (FDDI) protocol (ANSI X3T9.5). The Physical Layer Controller 10 has several primary blocks including: a phaser 11, a receiver 12, a hybrid Multiplexor (HMUX) 13, a transmitter 14, a configuration switch 15, connection management (CMT) 16, a multiplicity of storage registers 17 and a control bus interface 18.

The phaser 11 accepts a serial binary 125 MBits/sec Non-Return-To-Zero-Invert-On-Ones (NRZI) data stream from an external source, through a serial channel that connects with the FDDI network fiber optic transmission medium. The phaser 11 establishes the 5-bit symbol boundaries for the serial bit stream and synchronizes the local receiver clocks of the Physical Layer Controller 10 to the upstream station's transmitter clocks.

The receiver 12 accepts serial binary information from either the phaser 11 or from the transmitter 14 via one of two internal loopback paths. When necessary, the receiver 12 converts the information stream from the (NRZI) format utilized on the FDDI medium to Non-Return-To-Zero (NRZ) format used internally by the receiving station and decodes the NRZ data from external 5B coding to internal 4B coding. The receiver 12 also performs line state detection, link error detection and presents the data to the configuration switch 15 as internally coded symbol pairs.

The hybrid multiplexor 13 performs the functions of an HMUX as defined in the ANSI X3T9.5 Hybrid Ring Control Draft Proposed American National Standard. Therefore, the HMUX processes received cycles and determines where the information within a received cycle should be sent.

The transmitter 14 accepts information characters as symbol pairs from the internal 4B coding to the external 5B coding, filters out code violations in the information stream and redistributes Idle bytes which were added or deleted by the elasticity buffer. In addition, the transmitter 14 is capable of generating Idle, Master, Halt, Quiet or other user defined symbols. The transmitter 14 also converts the information stream from NRZ to NRZI and presents it to either the receiver 12 via one of the internal loopback paths or to the FDDI fiber optic medium as a serial bit stream.

The primary function of the configuration switch 15 is to route the information flow within the station to support multiple station configurations without requiring external logic. To accomplish this, the configuration switch controls the internal station data paths between ports and MACs. The control bus interface 18 gives the user access to the registers 17. This allows the user to program the configuration switch 15, to enable and disable functions within the receiver 12 and the transmitter 14, to report line states and link errors detected by the receiver 12, to report error conditions and to accomplish a variety of other control tasks.

Figure 2:
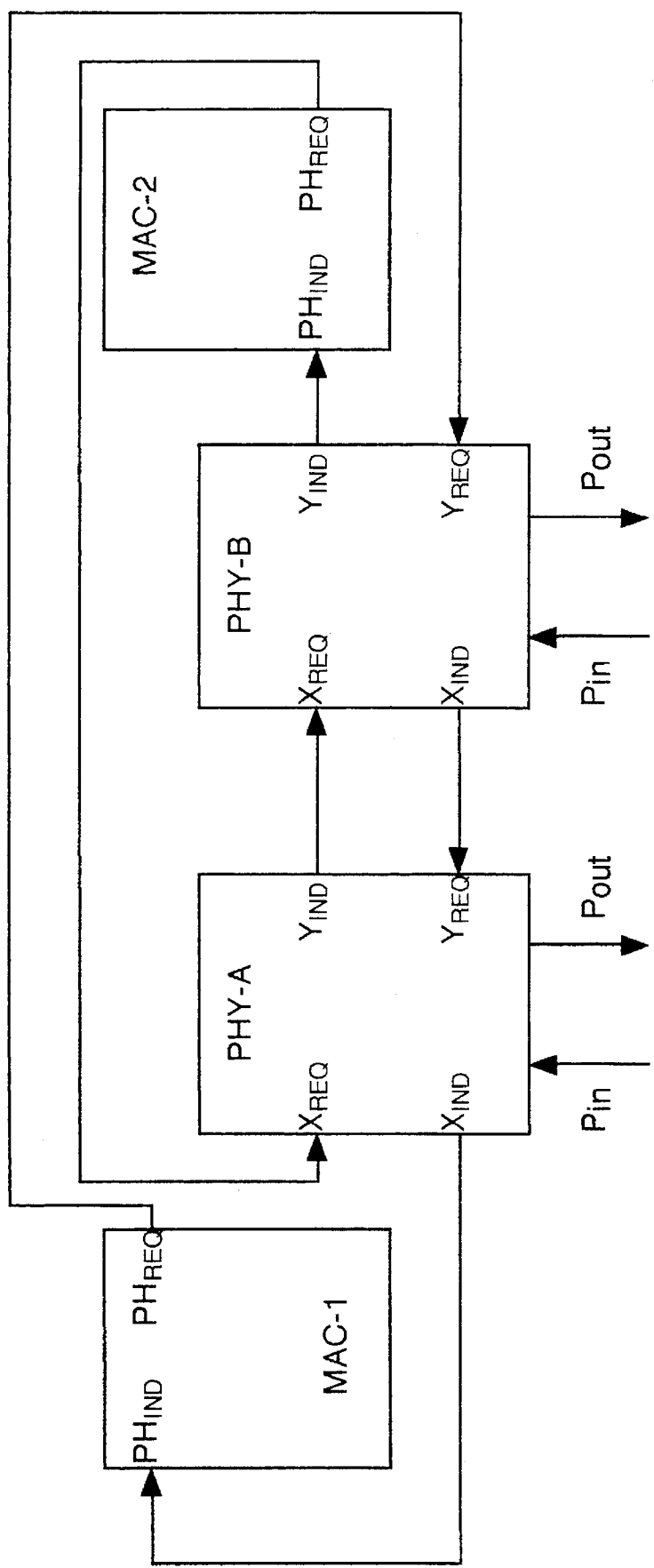
FIG. 2 is a block diagram of dual attachment station having a pair of MACs.

Referring next to FIG. 2, the functional configuration of a representative dual attachment station having a pair of MACs will be described. The dual attachment station includes two physical layers (PHYs), referred to as PHY-A and PHY-B herein. Each PHY includes a port that has both a physical input line ($P_{in}$) and a physical output line ($P_{out}$) which connect the station to the ports of neighboring nodes. Each PHY also has internal channel connections X, Y & Z (note the Z channel is not shown in FIG. 2). Each channel connection includes both a channel input (request) and a channel output (indicate). By way of example, the X channel connections are referred to as $X_{IND}$ (output) and $X_{REQ}$ (input).

The layout shown in FIG. 2 may not appear to be a conventional layout to those familiar with FDDI, however, it will be seen that the described configuration fully supports the FDDI standard. The physical connections between the PHYs and MACs is shown. Thus, $X_{IND}$ in PHY-A is connected to the input (labeled $PH_{IND}$ in the drawings) of the first MAC. The output of MAC-1 (labeled $PH_{REQ}$) is connected to $X_{REQ}$ in PHY-A. $Y_{IND}$ in PHY-A is then connected to $X_{REQ}$ in PHY_B and $Y_{IND}$ in PHY_B is connected to the input $PH_{IND}$ of the second MAC. The output of MAC-2 ($PH_{REQ}$) is coupled in turn to $Y_{REQ}$ of PHY_B. Finally, $X_{IND}$ in PHY-B is connected to $Y_{REQ}$ in PHY-A. The channel Z could then be used to support alternative MAC and PHY connections. As will be apparent to those skilled in the art after some study, this arrangement can fully support any FDDI configuration, as well as several non-standard configurations merely by controlling the configurations of the PHY's channel connections.

Figure 3:
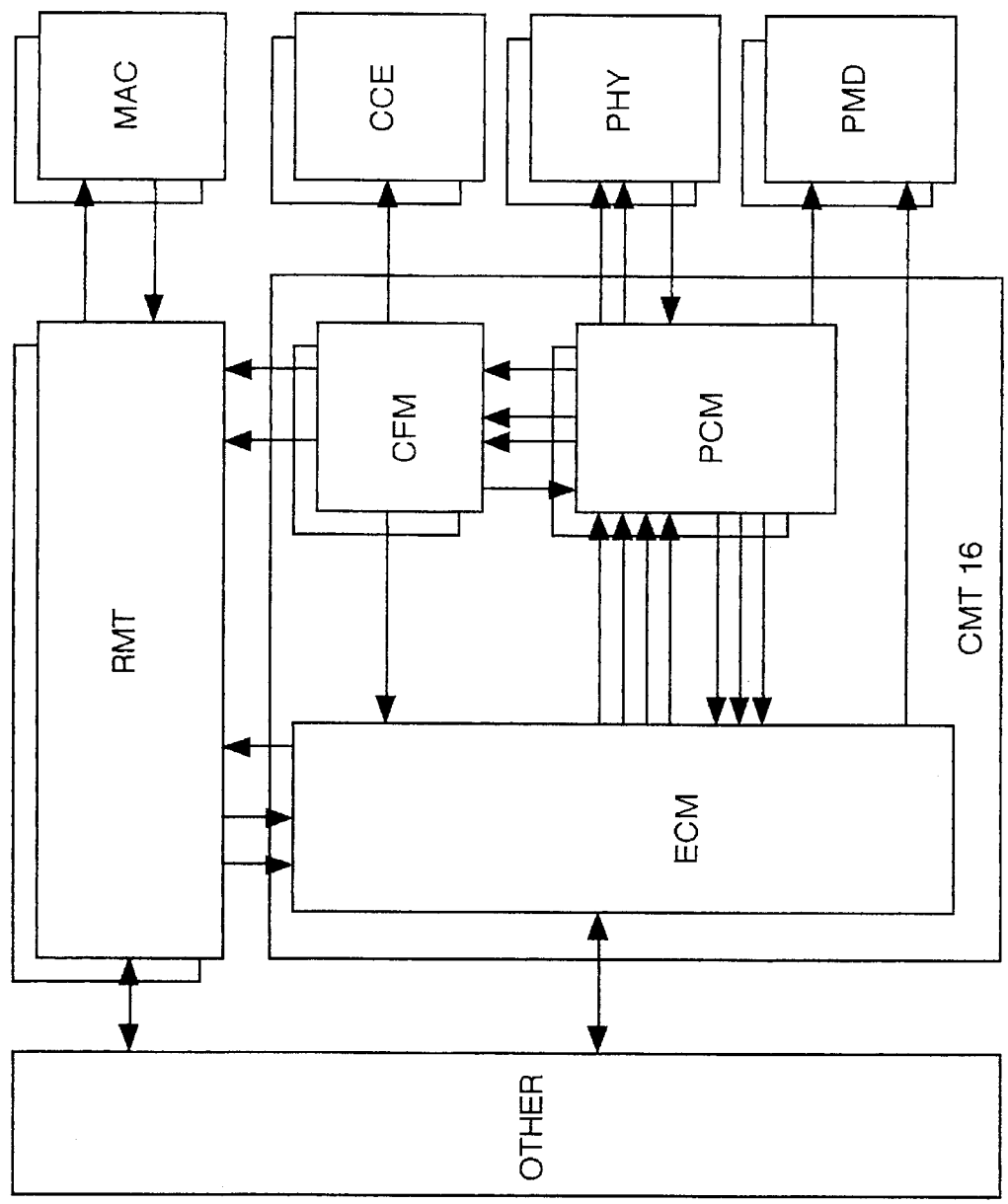
FIG. 3 is a block diagram of the Connection Management Structure within the Physical Layer Controller.

Referring next to FIG. 3, the Connection Management entity (CMT) 16 will be briefly described. In accordance with the FDDI protocol, the CMT 16 includes an Entity Coordination Management entity (ECM), a plurality of Physical Connection Management entities (PCM) and a plurality of Configuration Management entities (CFM). Within the FDDI protocol, one PCM is provided for each port, while one CFM is provided for each resource (i.e. each port or MAC).

The Configuration Management (CFM) is responsible for defining the interconnections of the ports and MAC(s) within a node. The CFM will connect and disconnect ports in accordance with PC_Join and PC_Loop flags issued by the PCM as described in detail in Brief et al's copending application Ser. No. 07/998,412 filed Dec. 29, 1992, entitled FDDI CFM STATE MACHINE USER INTERFACE, which is assigned to the assignee of the present application and which is incorporated herein by reference in its entirety. In addition to defining the interconnections within a node, the CFM is also responsible for making sure that frames do not become isolated from their source MAC after a ring reconfiguration. This is accomplished by scrubbing ports which may have sent a frame from a MAC that is no longer in the same ring after the reconfiguration takes place. The scrubbing arrangement is the primary focus of the present invention and will be described in more detail below. The CFM also must insure that a local reconfiguration does not cause frame concatenation due to the joining of two partial frames which of course would result in a combined frame with an unknown meaning. This is accomplished by generating two invalid symbols whenever an output is sourcing data from a new source. This guarantees that any concatenated frames will have at least two invalid symbols in it, which will serve to invalidate the frame.

The Connection Management entity 16 communicates with a variety of other entities within the station, including the Ring Management (RMT), the Configuration Control Element (CCE), the Physical Layer (PHY), the Physical Medium Dependent layer (PMD) and others. A more detailed explanation of the interrelationship of these entities is set forth in the previously cited ANSI FDDI Station Management Standard. However, for the sake of simplicity, the relationships that are not particularly relevant to the present invention, will not be described in detail herein.

A number of data registers 17 are provided to facilitate the control and operation of the Physical Layer Controller 10. Each data register 17 includes 8 or 16 bits that store information about the system. Most of the registers are not related to the scrubbing operation and therefore are not directly relevant to the present invention. Further, the actual significance of the contents of the registers may vary a great deal depending upon the desired features of the Physical Layer. Therefore, only the registers (and segments thereof) that are relevant to the present invention will be described herein.

The data registers 17 include a CFM Status register 32, a Scrub Timer Threshold Register 34, a pair of Null Configuration registers 41, a pair of Join Configuration registers 43, and a pair of Loop Configuration registers 45.

Figure 5:
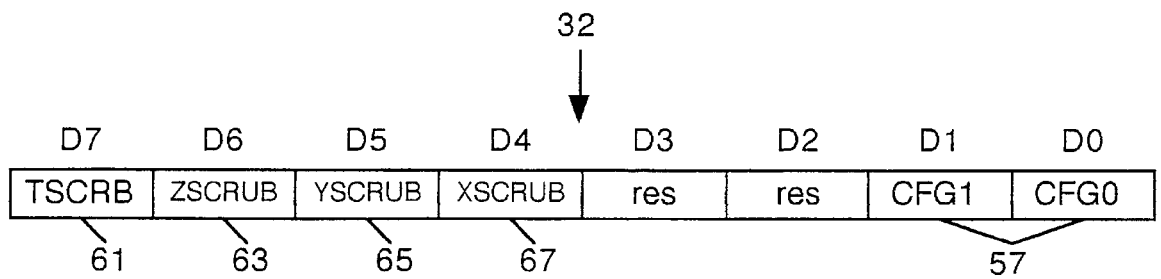
FIG. 5 is a diagram illustrating the contents of the CFM Status Register.

Turning next to FIGS. 5–9, the content and function of the various registers will be described. Referring initially to FIG. 5, the CFM Status register 32 will be described. The CFM Status register 32 is a read always register that provides general information about the current CFM configuration and the scrubbing flags. Bits D1 and D0 of the CFM Status register 32 form a configuration indicator 57 that indicates the current CFM configuration. Each potential CFM configuration has a corresponding value within the configuration indicator 57 (labeled CFG in the drawing) that will be set when the CFM enters the associated configuration. Thus, the user can always check the current configuration of the CFM. The CFM state machine user interface is described in more detail in Brief et al's copending application referenced above. As described in that application, there are three potential CFM configurations. That is, the null configuration which is represented by the value (0,0), the join configuration which is represented by the value (0,1), and the loop configuration which is represented by the value (1,0). The value (1,1) is reserved and has no meaning in the described embodiment.

Bits D2 and D3 in the CFM Status register 32 are reserved (res) and have no special meaning. Bits D4–D7 relate to scrubbing. Specifically, Bit D4 is a flag (labeled XSCRUB in the drawing) that is set when scrubbing is being performed on channel X. Bit D5 is a flag (labeled YSCRUB in the drawing) that is set when scrubbing is being performed on channel Y. Bit D6 is a flag (labeled ZSCRUB in the drawing) that is set when scrubbing is being performed on channel Z. And finally, bit D7 is a flag (labeled TSCRB in the drawing) that is set when scrubbing is being performed on the output from the transmitter 14.

Figure 6:
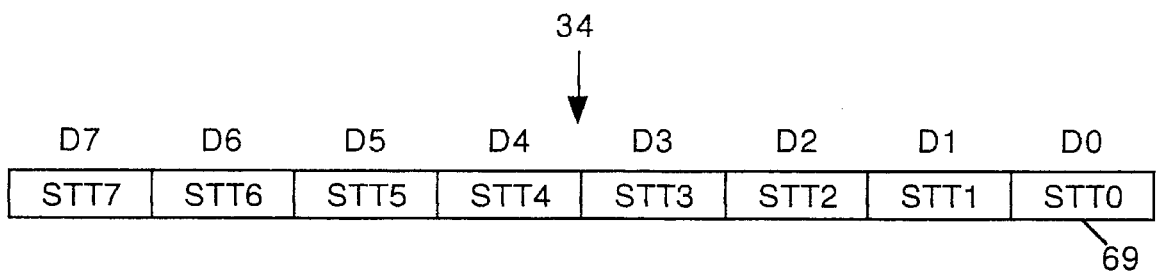
FIG. 6 is a diagram illustrating the contents of the Scrub Timer Threshold Register.

Turning next to FIG. 6, the Scrub Timer register 34 will be described. The Scrub Timer register is an eight bit read write register that may be written into by the user to set the threshold value of an internal scrub timer. More specifically, the register houses an eight bit timer index 69 which the user can utilize to control the duration of the scrubbing operation. Naturally the actual range of scrubbing durations that can be selected using the timer index 69 and the relationships between the value in the timer index and the actual scrubbing time can be varied widely in accordance with the needs of a particular system. By way of example, in the described embodiment, a linear relationship between a eight bit value in the timer index and the actual scrubbing time is provided. In this embodiment, the timer resolution is 51.2 microseconds. That is, each incremental value of one in the timer index adds 51.2 microseconds to the duration of the scrubbing. The minimum scrubbing duration is therefore approximately 51.2 microseconds, which is used when a value of one is stored in the timer index 69. When the maximum value (255) is stored in the timer index, the scrubbing will continue for a bit more than ten milliseconds.

Figure 7:
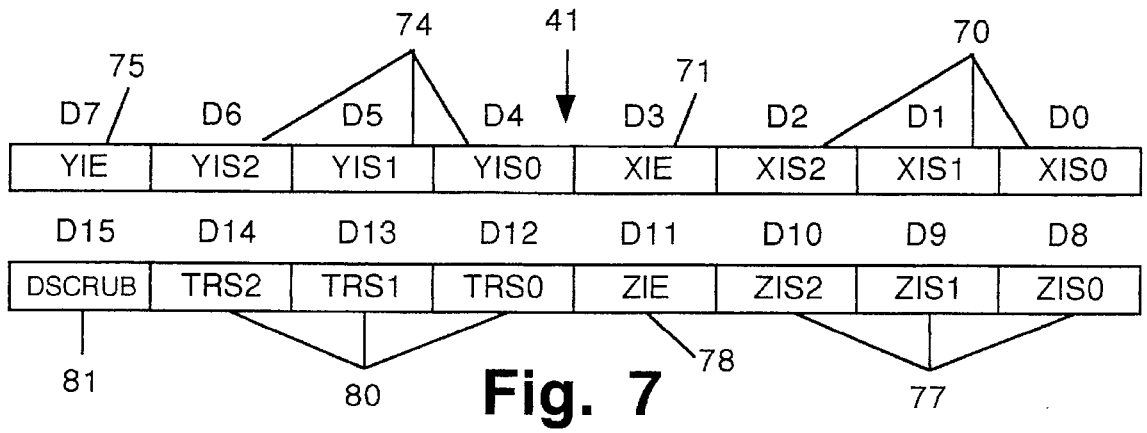
FIG. 7 is a diagram illustrating the contents of the Null Configuration Registers.
Figure 8:
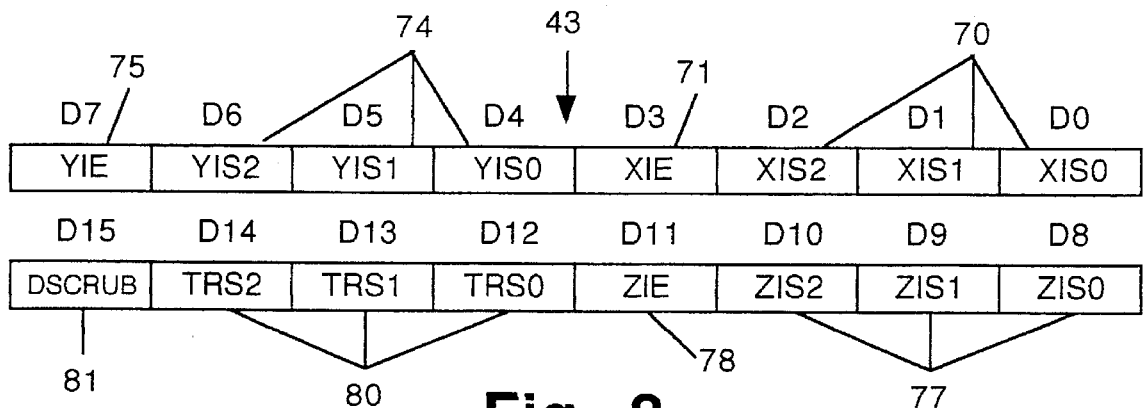
FIG. 8 is a diagram illustrating the contents of the Join Configuration Registers.
Figure 9:
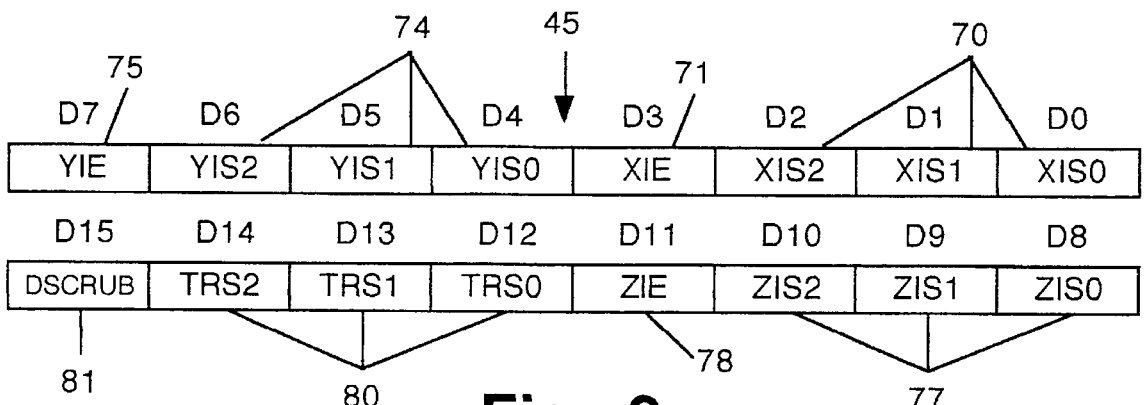
FIG. 9 is a diagram illustrating the contents of the Loop Configuration Registers.

Turning next to FIG. 7, the Null Configuration registers 41 will be described. The Null Configuration registers specify the values to be loaded into the Current Configuration registers (not shown) when the CFM state machine is in the Null state. Two eight bit registers constitute the Null Configuration registers in the described embodiment.

Bits D0–D2 within the Null Configuration registers form a three bit X channel selector 70 that is used to select the configuration switch data bus that is to be connected to the output ($X_{IND}$) of channel X. In the described embodiment, there are five configuration switch data buses and each has a corresponding value that can be stored with in the X channel selector. They include the PHY invalid bus (represented by the value (0,0,0)), the Receiver bus (0,0,1), the X_Request bus (0,1,0), the Y_Request bus (0,1,1) and the Z_Request bus (1,0,0). The remaining possible values are reserved for other purposes. The PHY invalid bus is a source of invalid symbols. The PHY Receiver bus connects $X_{IND}$ to $P_{in}$. The X_Request bus connects $X_{IND}$ to the input $X_{REQ}$ to channel X. The Y_Request bus connects $X_{IND}$ to the input $Y_{REQ}$ to channel Y. The Z_Request bus connects $X_{IND}$ to the input $Z_{REQ}$ to channel Z. Thus, the X channel output can be connected to any of the physical layer controller's inputs.

Bit D3 within the Null Configuration registers is used to enable or disable the output channel X. Specifically, when the X port enable bit 71 is set to a high level, output channel X is enabled. On the other hand, when the X channel enable bit 71 is cleared to a low level (i.e. a logical "zero"), output channel X is disabled.

Bits D4–D6 within the Null Configuration registers form a three bit Y channel selector 74 that functions identically to the X channel selector 70 except that it controls the connection of the output channel Y to the various configuration switch data buses. Similarly, Bit D7 is the Y channel enable bit 75, which functions similarly to the X channel enable bit 71. Bits D8–D11 have a similar function for the Z output channel. That is, Bits D8–D10 form a Z channel selector 77 and Bit D11 is a Z channel enable bit 78.

Bits D12–D14 for a transmit request selector that connects one of the configuration switch data buses to the input of the transmitter block 14. Finally, Bit D15 is a disable scrubbing flag 81 (labeled DSCRUB in the drawings). When the disable scrubbing flag 81 is set, it prohibits scrubbing on all channels when the CFM state machine enters the Null state. This gives the user the ability to bypass all hardware based scrubbing in response to a change in configuration.

The contents of the Join Configuration registers 43 (FIG. 8) and the Loop Configuration registers 45 (FIG. 9) are identical to the Null Configuration registers 41. The only difference is that the Join Configurations registers 43 store values indicative of the desired configuration when the CFM state machine is in the Join state. Similarly, the Loop configuration registers 45 store values indicative of the desired configuration when the CFM state machine is in the Loop state. The Join Configuration registers 43 contain the configuration to be loaded into the Current Configuration registers (not shown) when a CF_Join flag is provided and there are not any blocking conditions. Similarly, the Loop Configuration registers 45 contain the configuration to be loaded into the Current Configuration registers when a CF_Loop flag is provided and there are not any blocking conditions.

With the described arrangement of the configuration registers, each of the outputs of the Physical layer controller can be internally connected to any of the controller's inputs merely by writing the desired input into the appropriate channel selector. Additionally, should it ever be desired, more than one of the controller's outputs can be connected to a single input.

Each input (whether it be a channel input or the receiver input) and each output (whether it be a channel output or the transmitter output) has a scrubbing flag associated therewith. These are referred to as the Input Dirty flags (D) and the Output Dirty flags (OD) respectively. In essence, the intent is that the Output Dirty flag associated with a given output be set any time that a frame or cycle may have been sent out on that output since the last scrubbing and there is a possibility that such information can be isolated from its source. At the same time, the Input Dirty flag for a given input is intended to be set any time that a frame or cycle sent out on one of the output ports since the last scrubbing may be in route back at its associated input. However to simplify the hardware implementation, no attempt is made to determine what exists beyond the physical layer controller itself.

A channel output dirty flag is set any time that its associated output transmits a signal sourced from any of the valid inputs (i.e. any channel or receiver inputs). On the other hand, the transmitter output has a frame detector associated therewith that detects the passing of frames therethrough. Thus, its associated output dirty flag is only set when a frame start is sensed. It should be appreciated that in alternative embodiments, either the channel outputs can be provided with frame detectors or the frame detector associated with the transmitter output can be eliminated. In the former case, the channel output dirty flags would then be set only when a frame start is transmitted therethrough. In the latter case the transmitter's output dirty flag would be set any time that the transmitter output transmits a signal sourced from any of the valid inputs. Alternatively, the frame detectors can be placed at the inputs.

To simplify the present explanation, an output that does not have a frame detector associated with its corresponding output dirty flag will be considered to have the potential of having transmitted a data frame anytime that it is enabled and connected to a valid input. An output that does have a frame detector associated with its corresponding output dirty flag will be considered to have the potential of having transmitted a data frame anytime that it the data frame detector senses a frame start. In the described embodiment, the user has the option of disabling any one of the outputs. When the output is disabled, it does not have the potential of transmitting a data frame and therefore its Output Dirty flag would not be set regardless of which input it is connected to.

The Input Dirty flags (ID) are then set based on the status of the output dirty flags. More specifically, the Input Dirty flag associated with each input that is connected to an output for which an Output Dirty flag is set is in turn set. Therefore, if an output has its Output Dirty flag set, the Input Dirty flag of its associated input gets set as well.

CFM scrubbing is automatically performed by the described physical layer controller 10 after each configuration change, unless the associated scrubbing disable flag 81 is set. When automatic scrubbing is permitted, the logic will look at each output separately to determine whether scrubbing should be performed on that output. Scrubbing is triggered on an output whenever its source changes and in the new configuration, but with the old dirty flag settings, one of the Dirty flags (i.e. either the Output Dirty flag OD or the Input Dirty flag ID) associated with the new configuration is set.

When scrubbing is triggered, it will then continue for the length of time that is indicated by timer index 69 in the Scrub Timer Register 34. Since a single scrub timer is used, the ports will simultaneously scrub for the same amount of time. In the event that a configuration change is detected while a port is scrubbing, the scrub timer will be reset and all of the outputs that are currently scrubbing, together with any additional outputs that must be scrubbed due to the reconfiguration will all continue scrubbing until the reset scrubbing time period expires. The Dirty flags are not reset until scrubbing has been completed.

Figure 4A:
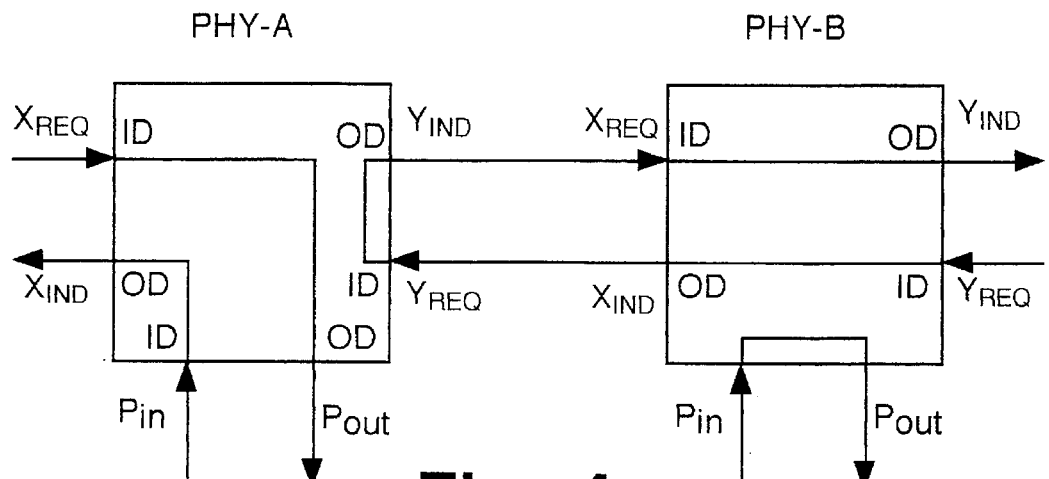
FIG. 4a is a block diagram showing the configuration and dirty bit settings of the PHYs of a dual attach station in a Wrap_A with B isolated state.
Figure 4B:
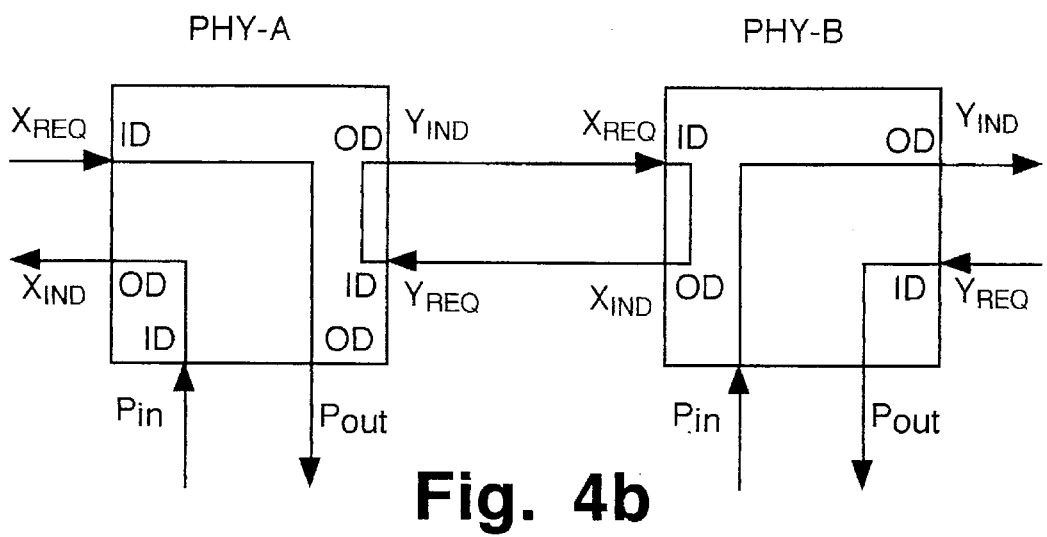
FIG. 4b is a block diagram showing the configuration and dirty bit settings of the PHYs of the dual attach station of FIG. 4a, immediately after a configuration change to the thru state while scrubbing occurs.
Figure 4C:
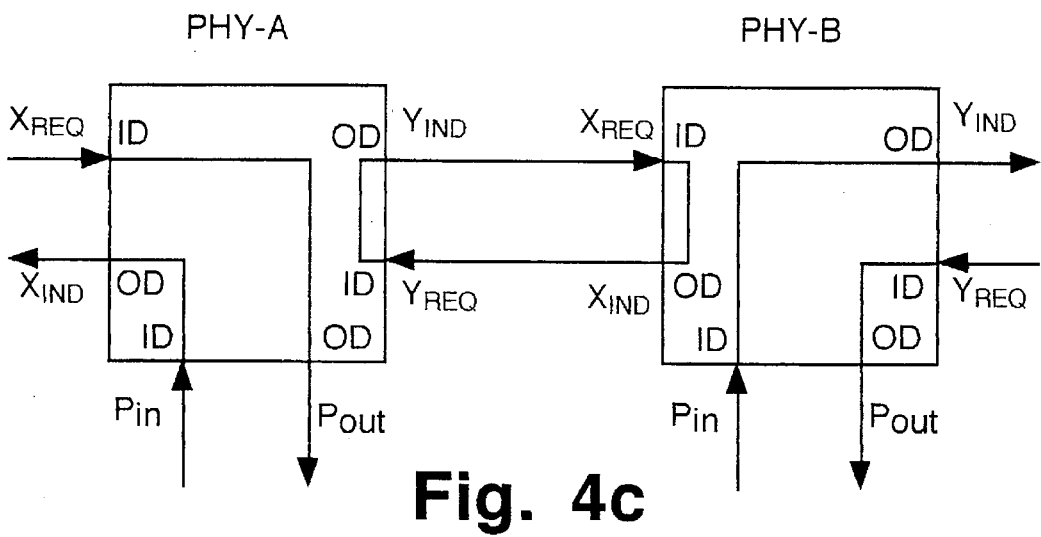
FIG. 4c is a block diagram showing the configuration and dirty bit settings of the PHYs of the dual attach station of FIG. 4b, in the thru state after scrubbing has been completed.

Referring next to FIGS. 4a–4c, the settings of the Dirty flags that are used during a representative configuration change will be described. The configuration change is from a "Wrap_A with B isolated" configuration as seen in FIG. 4a to a "Thru" configuration as seen in FIG. 4c. For the purposes of this example, it will be assumed that in the Wrap_A with B isolated configuration, the network side output of Port-B ($P_{out}$) is inactive while in the Thru configuration frames are transmitted from the Y channel input $Y_{REQ}$ through $P_{out}$.

In the Wrap_A with B isolated configuration, all outputs except the network interface for Port-B (i.e. the transmitter output) as well as their associated inputs are marked "dirty". As indicated above, the network side output is assumed to be inactive and not conveying any frames. Therefore, its associated output dirty flag is not set.

The physical layer controller 10 for Port-A receives inputs through the input port $P_{in}$, as well as through the inputs for channels X and Y ($X_{REQ}$ and $Y_{REQ}$ respectively). The output dirty flag for the X channel output $X_{IND}$ is set because it receives signals from a valid source, $P_{in}$. The Y channel output $Y_{IND}$ is also dirty since it is coupled to Y channel input $Y_{REQ}$. The transmitter output, $P_{out}$ is dirty because it is assumed in the example that the active port of the network going thru port-A is conveying frames. Additionally, the dirty flags for each of the inputs associated with a dirty output is set. That is, the input dirty flags are set for the receiver input $P_{in}$, as well as each channel input $X_{REQ}$ and $Y_{REQ}$.

The physical layer controller 10 associated with Port-B (which is a separate physical layer controller from the physical layer controller associated with Port-A) receives inputs from its own channel inputs $X_{REQ}$ and $Y_{REQ}$ as well as its own receiver input port $P_{in}$. In Port-B, $X_{IND}$ is dirty since it is coupled to $Y_{REQ}$, and $Y_{IND}$ is dirty since it is coupled to $X_{REQ}$. However, transmitter output $P_{out}$ is not dirty since (in this example) its frame detector has not detected the presence of any frames. Accordingly, the dirty flags associated with $P_{out}$ and $P_{in}$ are not set in the physical layer controller B. It is noted that in an alternative embodiment wherein a frame detector is not provided, then the transmitter output dirty flag would be set since the transmitter output $P_{out}$ is connected to a valid input $P_{in}$.

When the configuration of the node changes from "Wrap_A with B isolated" as seen in FIG. 4a to "Thru" as seen in FIG. 4b, the configuration of Port-A does not change in any way. Therefore, no scrubbing occurs on Port-A. However, the configuration of Port-B does change, and with that change, certain outputs of Port-B will be scrubbed as will be described with reference to FIG. 4b.

FIG. 4b shows the configuration of the physical layer controllers A and B and the Dirty flag status while scrubbing is being performed. As can be seen therein, scrubbing occurs after the new configuration has been entered. However, the Dirty flags are not updated until scrubbing has been completed. This insures that a proper scrubbing history will be maintained even in the event that multiple reconfigurations occur before the scrubbing operation has been finished. In the example, the X channel output $X_{IND}$, the Y channel output $Y_{IND}$, and the transmitter output $P_{out}$ of Port-B will all be scrubbed. As indicated above, scrubbing will occur on any output that has its source changed and either its associated Output Dirty flag set, or the Input Dirty flag of its associated source in the new configuration set. In the example, $P_{out}$ will be scrubbed because the Input Dirty flag of its new source $Y_{REQ}$ is set. $Y_{IND}$ will be scrubbed because it has a new source and its associated Output Dirty flag is set. $X_{IND}$ will be scrubbed because it has a new source and both its associated Output Dirty flag and the Input Dirty flag of its new source $X_{REQ}$ are set.

Once the scrubbing has been completed, the Dirty flags associated with ports that were just scrubbed are reset. As seen in FIG. 4c, the Dirty flags for PHY-A remain the same since PHY-A has not undergone a configuration change. The Dirty flags for PHY-B are all reset. The output of the X channel $X_{IND}$ is set because it is connected to a valid input $X_{REQ}$. The output of the Y channel $Y_{IND}$ is set because it is connected to valid input $P_{in}$. The transmitter output $P_{out}$ is set because it is now part of the active ring and according to our assumption is now passing frames. Note, however, that if the transmitter was not passing frames, its associated dirty flag would not be set.

After the output dirty flags have been set, the input dirty flags associated with each of PHY-B inputs are set, since each is connected to an output that has its output dirty bit set, each of the input dirty flags are also set. It is noted that if any of the outputs were disabled, then their associated dirty flags would not be set. The actual implementation resets all of the input dirty bits after the output dirty bits are reset. In an alternative embodiment, only the input dirty bits associated with inputs which had switched configurations could be reset.

As will be appreciated by those skilled in the art, by automatically scrubbing an output both when either its associated Output Dirty flag is set or when the Input Dirty flag of the output's new source is set, the physical layer controller can insure that sufficient scrubbing will occur to prevent frames from becoming isolated from their source. To insure complete scrubbing the timing indicated in the timer index 69 should be longer than the time it takes for a signal to pass completely around the ring which includes the output. Since the hardware is not able to know when rings are being joined or split, the described scrubbing policy may dictate scrubbing in situations where scrubbing is unnecessary. Therefore, the disable scrubbing flags 81 are provided to allow the user to disable hardware driven scrubbing after any configuration change. This feature is particularly useful for transitions out of the Isolated state.

Although only one embodiment of the present invention has been described, it should be understood that the present invention may be embodied in many other specific forms without departing from the spirit or scope of the invention. For example, the invention has been described with respect to an embodiment specifically adapted for FDDI based data transmission networks. However, the utility of the invention is not limited to FDDI based networks and can be readily applied to various other data transmission networks as well. Further, within FDDI based data transmission networks, the described invention is applicable to all FDDI nodes, whether they be stations or concentrators, single attachment nodes or dual attachment nodes. In the claims the word node is frequently used, this term is intended to encompass both stations and concentrators.

In the described embodiment, scrubbing occurs only on the outputs. However, in an alternative arrangement, scrubbing can be performed on the specific inputs that in the new configuration are associated with the outputs for which scrubbing is required. Therefore, the present examples are to be considered as illustrative and not restrictive, and the invention is not to be limited to the details given herein, but may be modified within the scope of the appended claims.

What is claimed is:

1. A physical layer controller for controlling the physical layer of a node that is capable of insertion into a data transmission network, the physical layer controller including:

a receiver having a receiver input that is suitable for connecting the node to the data transmission network;

a transmitter having a transmitter output that is suitable for connecting the node to the data transmission network;

a channel having a channel input and a channel output;

a transmitter output dirty flag associated with the transmitter output and a channel output dirty flag associated with the channel output, wherein each output dirty flag is arranged to be set to a first level by the physical layer controller when its associated output has a potential to transmit a data frame; and a receiver input dirty flag associated with the receiver input and arranged to be set to the first level by the physical layer controller when it sources signals to an output whose associated output dirty flag is set.

2. A physical layer controller as recited in claim 1 wherein when the configuration of the physical layer controller is changed, each output which is connected to a new input, does not have an associated blocking condition indicating that it may not be scrubbed, and has its associated output dirty flag set to the first level will be automatically scrubbed.

3. A physical layer controller as recited in claim 1 wherein when the configuration of the physical layer controller is changed, each output which receives a signal from a new input which has its associated input dirty flag set to the first level and does not have an associated blocking condition indicating that it may not be scrubbed will be automatically scrubbed.

4. A physical layer controller as recited in claim 1 wherein when the configuration of the physical layer controller is changed, each output which is connected to a new input, does not have an associated blocking condition indicating that it may not be scrubbed, and has its associated output dirty flag set to the first level will be automatically scrubbed and each output which receives a signal from a new input which has its associated input dirty flag set to the first level and does not have an associated blocking condition indicating that it may not be scrubbed, will be automatically scrubbed.

5. A physical layer controller as recited in claim 1 further comprising a scrub timer register that may be selectively written into by a user, the scrub timer register being arranged to control the length of time that scrubbing occurs after a configuration change.

6. A physical layer controller as recited in claim 1 further comprising a status register that may be read by a user, the status register including a plurality of output scrubbing flags, each output scrubbing flag being associated with a particular output and arranged to indicate whether scrubbing is being performed on its associated output. in accordance with the FDDI protocol.

7. A physical layer controller as recited in claim 1 further comprising a second channel having a channel input and a channel output associated therewith.

8. A physical layer controller as recited in claim 7 further comprising a third channel having a channel input and a channel output associated therewith.

9. A physical layer controller as recited in claim 1 wherein the data transmission network is capable of operating substantially in accordance with the FDDI protocol.

10. A physical layer controller as recited in claim 1 wherein when the configuration of the physical layer controller is changed and there are no blocking conditions indicating that the receiver input may not be scrubbed, and further if the receiver input is connected to a new output which has its associated output dirty flag set to the first level, then the receiver input will be automatically scrubbed.

11. A physical layer controller as recited in claim 1 wherein when the configuration of the physical layer controller is changed and there are no blocking conditions indicating that the receiver input may not be scrubbed, and further if the receiver input is connected to a new output which has its associated input dirty flag set to the first level, then the receiver input will be automatically scrubbed.

12. A physical layer controller as recited in claim 1 further comprising a frame detecting means that detects the passage of a frame through the transmitter wherein the frame detecting means sets the transmitter output dirty flag anytime it detects the beginning of a frame being outputted from the transmitter.

13. A physical layer controller as recited in claim 1 wherein the channel output is considered to have the potential to transmit a frame when it is connected to a valid input.

14. A physical layer controller as recited in claim 1 wherein the channel output is considered to have the potential to transmit a frame when a frame detecting means associated therewith detects the passage of the beginning of a frame therethrough.

15. A physical layer controller for controlling the physical layer of a node that is capable of insertion into a data transmission network, the physical layer controller including:

a receiver having a receiver input;

a transmitter having a transmitter output;

a channel having a channel input and a channel output associated therewith;

a channel output dirty flag associated with the channel output and a transmitter output dirty flag associated with the transmitter output;

a receiver input dirty flag associated with the receiver input; and scrubbing means for automatically scrubbing certain outputs after a configuration change, wherein after a configuration change, the scrubbing means will automatically scrub each output which is connected to a new input, does not have an associated blocking condition indicating that it may not be scrubbed, and one of, a) its associated output dirty flag set to a first level, and b) the input dirty flag of its new input set to the first level.

16. A physical layer controller as recited in claim 15 further comprising at least one scrubbing disable flag that can be set by a user, the physical layer controller being arranged to disable the automatic scrubbing function of the scrubbing means when the scrubbing disable flag is set and the physical layer controller enters a configuration associated with the scrubbing disable flag.

17. A physical layer controller as recited in claim 15 further comprising a scrub timer register that may be selectively read and written into by a user, the scrub timer register being arranged to control the length of time that scrubbing occurs after the configuration change.

18. A physical layer controller as recited in claim 15 further comprising a status register that may be read by the user, the status register including a channel output scrubbing flag associated with the channel output and a transmitter output scrubbing flag associated with the transmitter output, each output scrubbing flag arranged to indicate whether scrubbing is being performed on its associated output.

19. A physical layer controller as recited in claim 18 further comprising a second channel having an input and an output associated therewith and a second channel output scrubbing flag associated with the second channel output.

20. A physical layer controller as recited in claim 19 further comprising a third channel having an input and an output associated therewith and a third channel output scrubbing flag associated with the third channel output.

21. A physical layer controller as recited in claim 15 further comprising a frame detecting means that detects the passage of a frame through the transmitter wherein the frame detecting means sets the transmitter output dirty flag anytime it detects a beginning of a frame being outputted from the transmitter.

22. A physical layer controller for controlling the physical layer of a station that is capable of insertion into a data transmission network that is capable of operating substantially in accordance with the FDDI protocol, the physical layer controller including a configuration management entity that includes a CFM state machine and is capable of configuring the physical layer controller substantially in compliance with the FDDI protocol, the physical layer controller further comprising:

a receiver having a receiver input associated therewith;

a transmitter having a transmitter output associated therewith;

first and second channels, each channel having a channel input and a channel output associated therewith;

a null configuration register capable of storing information indicative of a desired configuration of the physical layer controller when the CFM state machine is in a null configuration;

a join configuration register capable of storing information indicative of a desired configuration when the CFM state machine is in a join configuration;

a loop configuration register capable of storing information indicative of a desired configuration when the CFM state machine is in a loop configuration;

a plurality of output dirty flags, each output dirty flag being associated with a particular one of the transmitter output, the first channel output, and the second channel output;

a plurality of input dirty flags, each input dirty flag being associated with a particular one of the receiver input, the first channel input, and the second channel input; and scrubbing means for automatically scrubbing certain outputs after a configuration change, wherein after a configuration change, the scrubbing means will automatically scrub each output which has a new input, does not have a associated blocking condition indicating that it may not be scrubbed, and one of, its associated output dirty flag set to a first level, and the input dirty flag of its new input set to the first level.

23. A physical layer controller as recited in claim 22 further comprising a null scrubbing disable flag, a join scrubbing disable flag and a loop scrubbing disable flag that can be set by a user, the null scrubbing disable flag being associated with the null configuration, the join scrubbing disable flag being associated with the join configuration, and the loop scrubbing disable flag being associated with the loop configuration, wherein the physical layer controller is arranged to disable the automatic scrubbing function when the CFM enters a configuration associated with a scrubbing disable flag that is set.

24. A physical layer controller as recited in claim 23 wherein the null scrubbing disable flag is located in the null configuration register, the join scrubbing disable flag is located in the join configuration register and the loop scrubbing disable flag is located in the loop configuration register.

25. A physical layer controller as recited in claim 23 further comprising a scrub timer register that may be selectively read and written into by the user, the scrub timer register being arranged to control the length of time that scrubbing occurs after a configuration change.

26. A physical layer controller as recited in claim 25 further comprising a status register that may be read by the user, the status register including a plurality of output scrubbing flags, each output scrubbing flag being associated with a particular output and arranged to indicate whether scrubbing is being performed on its associated output.

27. A physical layer controller as recited in claim 26 further comprising a third channel having an input and an output associated therewith and wherein the output scrubbing flags include a transmit output scrubbing flag, a first channel scrubbing flag, a second channel scrubbing flag and a third channel scrubbing flag.

28. A method of automatically scrubbing the outputs of a physical layer controller as recited in claim 15, the physical layer controller including a plurality of channels each having an associated channel input and an associated channel output, the method comprising the steps of:

setting the output dirty flag associated with each output that transmits a signal sourced from one of the channel inputs or takes the form of a channel output that outputs a signal sourced from the receiver input;

setting the input dirty flag associated with each input that is connected to an output for which an output dirty flag is set;

changing the configuration of the physical layer controller to an updated configuration;

scrubbing each output of the physical layer controller in the updated configuration which has a new input and for which at least one of the output dirty flag and the input dirty flag of the output's input in the updated configuration is set; and resetting the input and output dirty flags in accordance with the characteristics of the updated configuration.

29. A method of automatically scrubbing outputs of a physical layer controller arranged for controlling a physical layer of a node that is capable of insertion into a data transmission network, wherein the physical layer controller includes input ports, output ports, a plurality of output dirty flags, each output dirty flag being associated with a particular output and a plurality of input dirty flags, each input dirty flag being associated with a particular one of the inputs, the method comprising the steps of:

setting an output dirty flag associated with each output that has a potential to transmit a data frame;

setting an input dirty flag associated with each input that is connected to an output for which an output dirty flag is set;

changing the configuration of the physical layer controller to an updated configuration;

scrubbing selected ports so that each output of the physical layer controller in the updated configuration which has a new input and for which at least one of the output's associated output dirty flag and the input dirty flag of that output's new input in the updated configuration is set; and resetting the input and output dirty flags in accordance with the characteristics of the updated configuration.

30. A method as recited in claim 29 wherein the scrubbing is performed for a period that is dictated by a value stored in a scrubbing timer register.

31. A method as recited in claim 29 further comprising the step of setting an output scrubbing flag associated with each output upon which scrubbing is being performed while such scrubbing is being performed.

32. A method as recited in claim 29 wherein each output dirty flag associated with an output which has a new input is reset after the scrubbing operation is complete.

33. A method as recited in claim 32 wherein all of the input dirty flags are reset after the output dirty flags have been set.

34. A method of automatically scrubbing outputs of a physical layer controller arranged for controlling a physical layer of a node that is capable of insertion into a data transmission network, wherein the physical layer controller includes inputs and outputs, the method comprising the steps of:

detecting a change in the configuration of the physical layer controller between a first configuration and an updated configuration;

scrubbing each output of the physical layer controller in the updated configuration which has a new input and which in the first configuration had a potential to output data frames; and scrubbing each output of the physical layer controller in the updated configuration which has a new input which in the first configuration was connected to an output that had the potential to output data frames; and resetting the input and output dirty flags in accordance with the characteristics of the updated configuration.

35. A method as recited in claim 34 wherein the outputs include a transmitter output and a frame detecting means is provided that detects the passage of a frame through the transmitter wherein the frame detecting means sets the transmitter output dirty flag anytime it detects the beginning of a frame being outputted from the transmitter.

36. A physical layer controller as recited in claim 34 wherein a selected one of the outputs is considered to have the potential to transmit a frame whenever it is connected to a valid input.

37. A physical layer controller as recited in claim 34 wherein a selected one of the outputs is considered to have the potential to transmit a frame whenever a frame detector associated therewith detects the passage of the beginning of a data frame.

38. A physical layer controller for controlling the physical layer of a node that is capable of insertion into a data transmission network, the physical layer controller including:

a receiver having a receiver input that is suitable for connecting the node to the data transmission network;

a transmitter having a transmitter output that is suitable for connecting the node to the data transmission network;

a channel having a channel input and a channel output;

a transmitter output dirty flag associated with the transmitter output and a channel output dirty flag associated with the channel output, wherein each output dirty flag is arranged to be set to a first level by the physical layer controller when its associated output has a potential to transmit a data frame;

a receiver input dirty flag associated with the receiver input and arranged to be set to a first level by the physical layer controller when it sources signals to an output whose associated output dirty flag is set; and a scrub timer register that may be selectively written into by a user, the scrub timer register being arranged to control the length of time that scrubbing occurs after a configuration change.

* * * * *

UNITED STATES PATENT AND TRADEMARK OFFICE
CERTIFICATE OF CORRECTION

PATENT NO. : 5,577,206
DATED : November 19, 1996
INVENTOR(S) : Friedrich et al.

It is certified that error appears in the above-indentified patent and that said Letters Patent is hereby corrected as shown below:

Column 1, line 57, change "tings" to --rings--.

Column 1, line 59, change "tings" to --rings--.

Column 1, line 64, change "ting" to --ring--.

Column 2, line 11, change "ting" to --ring--.

Column 8, line 65, change "(D)" to --(ID)--.

Column 12, line 57, delete the "." after --output--.

Signed and Sealed this

Twenty-second Day of July, 1997

Attest:

BRUCE LEHMAN

*Attesting Officer*  *Commissioner of Patents and Trademarks*